US006764703B2

(12) United States Patent
Lee et al.

(10) Patent No.: US 6,764,703 B2
(45) Date of Patent: Jul. 20, 2004

(54) PIGMENT EXTRACTION SYSTEM AND METHOD

(75) Inventors: Hyoung S. Lee, Winter Haven, FL (US); Gary A. Coates, Lakeland, FL (US)

(73) Assignee: Florida Department of Citrus, Lakeland, FL (US)

( * ) Notice: Subject to any disclaimer, the term of this patent is extended or adjusted under 35 U.S.C. 154(b) by 317 days.

(21) Appl. No.: 09/968,582

(22) Filed: Oct. 1, 2001

(65) Prior Publication Data

US 2003/0091704 A1 May 15, 2003

(51) Int. Cl.[7] .............................. A23L 2/00; A23N 1/00
(52) U.S. Cl. ...................... 426/252; 426/425; 426/540
(58) Field of Search ............................... 426/252, 425, 426/540

(56) References Cited

U.S. PATENT DOCUMENTS

| | | | | |
|---|---|---|---|---|
| 1,848,760 A | * | 3/1932 | Willison | 426/489 |
| 3,037,975 A | | 6/1962 | Cohn | |
| 3,385,711 A | * | 5/1968 | Speriti et al. | 426/431 |
| 3,404,990 A | | 10/1968 | Villadsen | |
| 3,523,138 A | | 8/1970 | Grant | |
| 3,725,083 A | | 4/1973 | Barron et al. | |
| 3,906,112 A | | 9/1975 | Anderson | |
| 3,930,037 A | * | 12/1975 | Yokoyama et al. | 426/268 |
| 4,126,709 A | | 11/1978 | Johnson et al. | |
| 4,377,520 A | | 3/1983 | Howell et al. | |
| 4,608,266 A | | 8/1986 | Epperson et al. | |
| 5,858,700 A | | 1/1999 | Ausich et al. | |
| 6,365,212 B1 | * | 4/2002 | McArdle et al. | 426/262 |

FOREIGN PATENT DOCUMENTS

DE 2458178 * 6/1975

OTHER PUBLICATIONS

Huffman, W. A. Hooper, et al., Processed Juices From Texas Red and Pink Grapefruit—A Progress Report, Journal of the Rio Grande Valley Horticultural Society, Issue 7, 1953, pps. 102–105.

Griffiths, Francis, et al., Debittering of Grapefruit Products with Naringase, Food Technology, Aug., 1959, pps. 430–432.

Lime, Bruce, et al., The Preservation of Pulp and Fortification of Late Season Poorly Colored Red Grapefruit Juice, Journal of the Rio Grande Valley Horticultural Society, Issue 14, 1960, pps. 88–93.

Cruse, Robert, et al., Pigmentation and Color Comparison of Ruby Red and Star Ruby Grapefruit Juice, J. Agric. Food Chem., vol. 27, No. 3, 1979, pps. 641–642.

Ting, S. V., et al., Color and Processing Characteristics of Star Ruby Grapefruit, Proc. Fla. State Hort. Soc., Issue 93, 1980, pps. 293–295.

Yokoyama, H., et al., Induced Color Changes in Grapefruit and Orange, Phytochemistry, vol. 11, 1972, pps. 1721–1724.

Huggart, R.L., et al., Color Standardization of Pigmented Grapefruit Juices, Florida State Horticultural Society, 1970, pps. 277–281.

* cited by examiner

Primary Examiner—N. Bhat
(74) Attorney, Agent, or Firm—Allen, Dyer, Doppelt, Milbrath & Gilchrist, P.A.

(57) ABSTRACT

A method for extracting a color-enhancing pigment includes separating grapefruit into in-line pulp and juice and then separating the juice into clarified juice and retentate. The retentate or the in-line pulp is then homogenized to form a slurry, and the pigment is recovered from the slurry. The extraction method of the present invention is accomplished without the use of enzymes or harsh organic solvents, but rather is aqueous-based. The system includes an extractor and a finisher to separate citrus fruit into in-line pulp and juice. An ultrafiltration unit is used to separate the juice into clarified juice and retentate. Homogenization is accomplished with applied pressure, and pigment recovery, by washing and centrifugation.

41 Claims, 6 Drawing Sheets

PIGMENT EXTRACTION SYSTEM AND METHOD

BACKGROUND OF THE INVENTION

1. Field of the Invention

The present invention relates to pigment extraction systems and methods, and, more particularly, to such systems and methods for use in color enhancement of juices.

2. Description of Related Art

An improvement in the color of a comestible or edible product is often sought in order to enhance the product's visual appeal and, hence, marketability. Such products include fruit juices, including grapefruit juice.

The addition of highly colored pulp to grapefruit juice is known in the art (W. A. H. Huffman et al., *J. Rio Grande Valley Hort. Soc.* 7, 102–5, 1953; F. P. Griffiths and B. J. Lime, *Food Technol.* 430–32, 1959; B. J. Lime and F. P. Griffiths, *J. Rio Grande Holt. Soc.* 14, 88–93, 1960). It is also known to blend grapefruit juice with a highly colored grapefruit such as Star Ruby (R. R. Cruse et al., *J. Agric. Food Chem.* 27, 641–42, 1979; S. V. Ting et al., *Proc. Fla. State Hort. Soc.* 93, 293–95, 1980). It is further known in the art to apply a carotenoid bioregulator (H. Yokohama et al., *Phytochem.* 11, 1721–24, 1972) and to add artificial color (R. L. Huggart and S. V. Ting, *Proc. Fla. State Hort. Soc.* 83, 277–81, 1970).

The drawbacks of the previous methods known in the art include excessive bitterness, excess pulp content, limited fruit availability, and the juice negative connotations associated with the addition of foreign materials into the juice.

In a study with orange juice, an addition of chromoplasts from tangerines to orange juice (R. W. Barron et al., U.S. Pat. No. 3,725,083) was reported to improve color.

The process of Cohn (U.S. Pat. No. 3,037,975) includes removing aqueous liquors from citrus fruit peel, adjusting the pH, and heating the liquor to form a pasty product that contains flavoring and coloring substances. The method of Sperti (U.S. Pat. No. 3,385,711) involves the removal of a "bitterness characteristic" from the pulp of a citrus fruit that has a tendency to become bitter with time. Villadsen (U.S. Pat. No. 3,404,990) teaches an addition to citrus juice of peels and/or rags of citrus fruits. The method of Grant (U.S. Pat. No. 3,523,138), which is for extracting a xanthophyll product from marigold petal meal, includes an addition of alkali and aliphatic alcohol, followed by treatment with an inert organic solvent. Barron et al. (U.S. Pat. No. 3,725,083) describe the removal of "chromoplasts" from filtered juice by centrifugation to provide a material for adding color to other juices. The extraction method of Anderson (U.S. Pat. No. 3,906,112) includes the preparation of an oil extract of carotenoid pigment in crustacean shell waste. Johnson et al. (U.S. Pat. No. 4,126,709) and Howell et al. (U.S. Pat. No. 4,377,520) use oil from the flavedo of the fruit as a source of a carotenoid product. Epperson et al. (U.S. Pat. No. 4,608,266) teach a process for forming a citrus juice extender from the flavedo. The process of Ausich et al. (U.S. Pat. No. 5,858,700) is for producing lycopene crystals from oleoresin, and admixing the oleoresin with propylene glycol, alkali, and water to form a saponification mixture, which yields the desired crystals.

SUMMARY OF THE INVENTION

It is therefore an object of the present invention to provide a system and method for extracting a pigment for use in enhancing a color of grapefruit juice.

It is a further object to provide such a system and method for extracting a carotenoid pigment.

It is another object to provide such a system and method for extracting a carotenoid pigment that is water-dispersible.

It is also an object to provide such a system and method for extracting pigment without the use of enzymes or organic solvents.

It is an additional object to provide a system and method of enhancing the color of grapefruit juice.

These and other objects are achieved by the present invention, a system and method for extracting a color-enhancing pigment. The method comprises the steps of separating grapefruit into in-line pulp and juice and then separating the juice into clarified juice and retentate. At least one of the retentate and the in-line pulp is then homogenized to form a slurry, and the pigment is recovered from the slurry.

It should be noted that the extraction method of the present invention is accomplished without the use of enzymes or harsh organic solvents, but rather is an aqueous-based method.

The system of the present invention comprises means for carrying out the above steps, including an extractor and a finisher such as are known in the art to separate citrus fruit into in-line pulp and juice. An ultrafiltration unit is used to separate the juice into clarified juice and retentate. Homogenization is accomplished with applied pressure, and pigment recovery, by washing and centrifugation.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIGS. 4A–4D are graphs of color and pigment improvement with Example 1, with FIG. 4A illustrating color improvement; FIG. 4B, the pigment concentration with increase with extract concentration; FIG. 4C, the flavor score change with the addition of pigment extract; and FIG. 4D, the effect of pigment extract on viscosity and pulp content.

DETAILED DESCRIPTION OF THE PREFERRED EMBODIMENTS

A description of the preferred embodiments of the present invention will now be presented with reference to FIGS. 1–6B.

Figure 1:
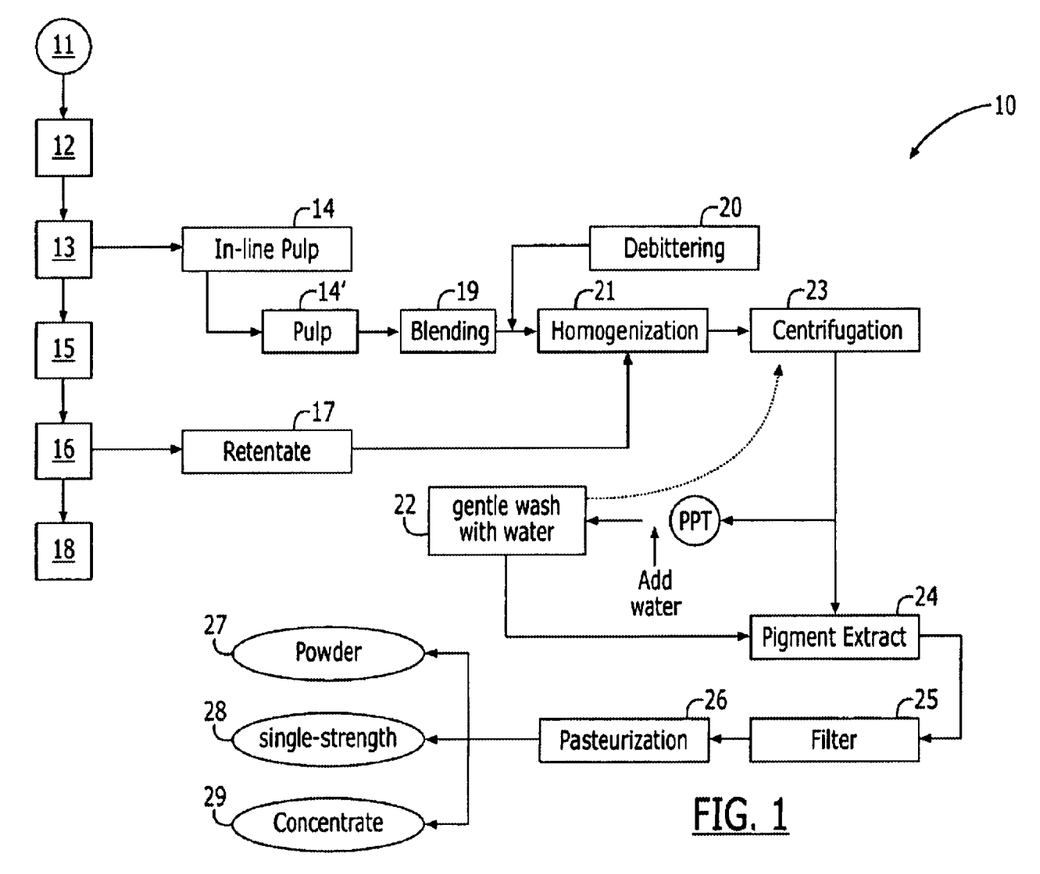
FIG. 1 is a schematic diagram of the pigment extraction method of the present invention.

One aspect of the present invention is a system and method for extracting natural pigment from a citrus source without the use of enzymes or harsh organic solvents, with the use of an aqueous medium. A schematic of the method 10 of this aspect is illustrated in FIG. 1.

Two pigment sources are obtained from citrus fruit, more particularly, grapefruit. By methods known in the art, the fruit 11 is subjected to an extractor 12 and finisher 13, which yield in-line pulp 14 and juice 15. The juice 15 undergoes ultrafiltration in a device 16 such as an ultrafiltration unit having three hollow-fiber cartridges (Romicon, Inc., or Koch Membrane), which yields retentate (pulp) 17 and clarified juice 18.

Figure 2A:
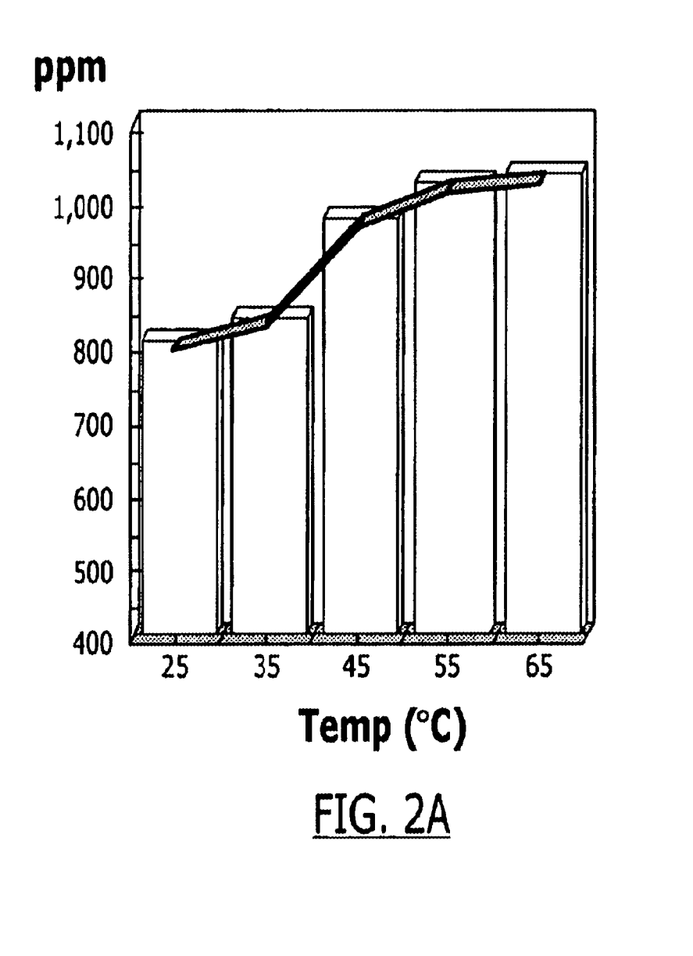
FIGS. 2A and 2B are graphs of the release of bitter compounds from blended in-line pulp with applied pressure, with FIG. 2A illustrating naringin release and FIG. 2B, limonin release.
Figure 2B:
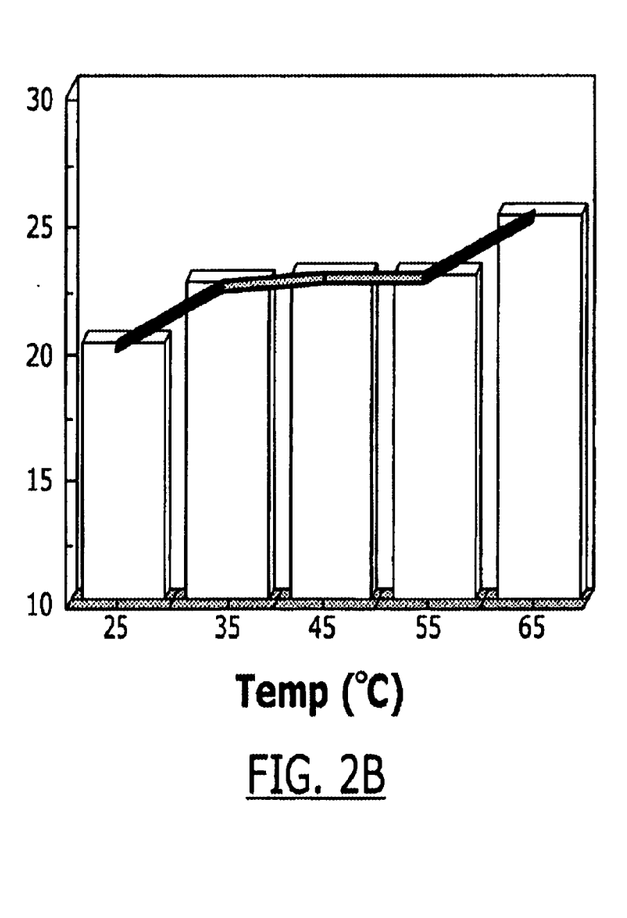

The in-line pulp 14, after blending 19, was found to require debittering to remove bitter compounds, such as naringin and limonin. The debittering step 20 includes a hot water rinse. The results of varying temperatures are shown in FIGS. 2A and 2B, which illustrate that, as the temperature of the water rinse increases, an increased amount of bitter compound removal is effected, with maximum efficiency for both compounds achieved at approximately 45° C., where naringin removal levels off.

Figure 3A:
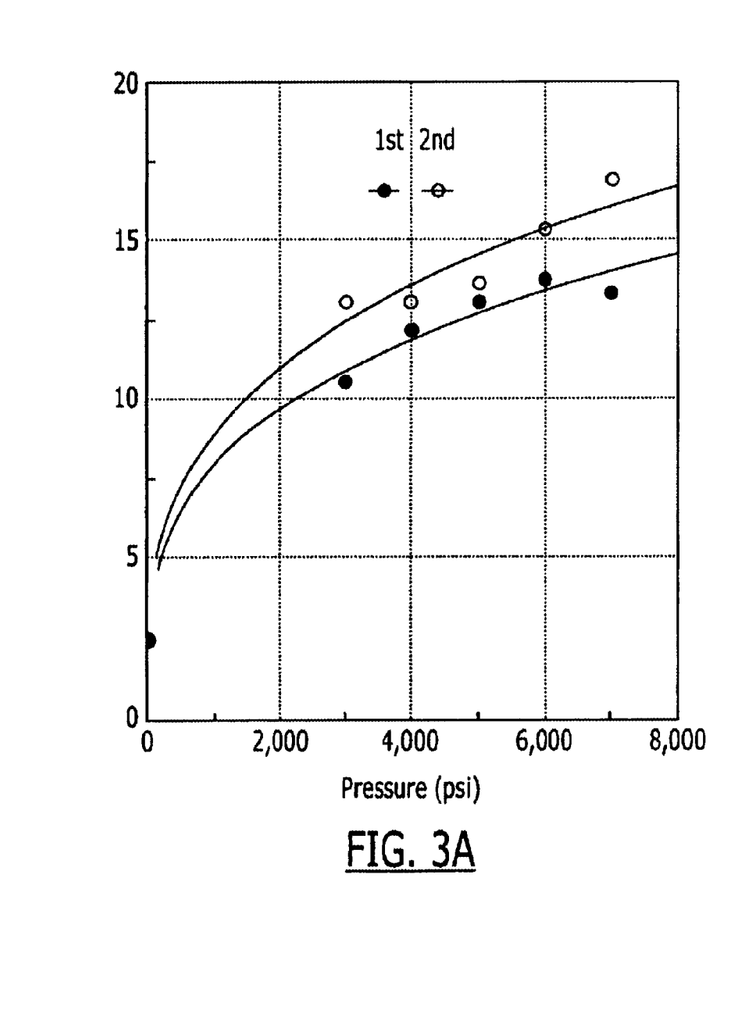
FIGS. 3A and 3B are graphs of the release of pigment from pulp with applied pressure, with FIG. 3A illustrating β-carotene release and FIG. 3B, lycopene release.
Figure 3B:
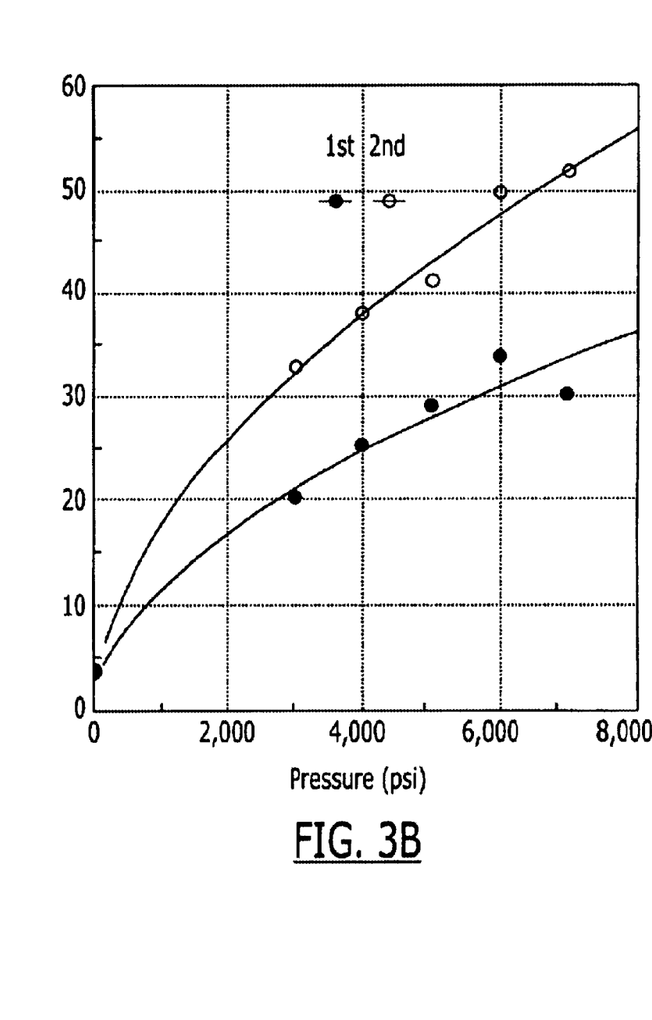

Preliminary tests of the method had indicated that carotenoid pigment was released from the pulp. Thus fine particles of pulp may be suspended in the juice as well. A study of different levels of homogenization 21 was undertaken to optimize the extraction method (FIGS. 3A, 3B). At levels of pressure that were too low, pigment extraction was negligible; at excessive pressures or too many cycles of homogenization, heat was generated that was undesirable in terms of pigment stability and a "cooked" odor in the pigment solution.

Following homogenization of the retentate 17 or the debittered pulp 14, the retentate 17 or the debittered pulp 14 are next washed with water 22 and centrifuged 23 to recover pigment 24, which remains in the supernatant. The washing and centrifuging steps may be repeated to maximize pigment extraction. Following another filtering step 25 and pasteurization 26, the pigment is added to the juice, which may be in the form of powder 27, single-strength 28, or concentrate 29.

Initial studies using the direct addition of retentate from filtration membranes provided a significant increase in color value (a*) and pigment content (β-carotene and lycopene). However, viscosity increased and the pulp content exceeded 10% with only a 2% addition of retentate. A 2% level of retentate addition did not provide sufficient pigment to reach the target a* level of 2.0 needed to provide a noticeable red color to the juice. Further treatment of the retentate was required to break down the pulp and release the pigments.

Preparation of Pigment from Retentate

EXAMPLE 1

Maximize Pigment Concentration

Retentate (950 mL), which contains all the pulp/pigment, was homogenized for two separate cycles at 7000 psi. The resulting slurry (875 mL) was then centrifuged at 6500 rpm at 5° C. for 10 min. The supernatant (735 mL) containing the pigment was collected and filtered through P8 filter paper under vacuum. The sample was then pasteurized by heating to 80° C., poured into a HDPE bottle, and cooled in an ice water bath. The carotenoid pigment was well suspended in the aqueous solution without precipitation.

EXAMPLE 2

Maximize Pigment Recovery

A 1-qt bottle of Star Ruby retentate obtained from the large ultrafiltration unit in a pilot plant is homogenized at 7000 psi for two separate cycles. A total volume of 875 mL was obtained from the homogenizer. Three rinses were performed to maximize the recovery of pigments. The resulting retentate solution was centrifuged at 6500 rpm for 10 min at 5° C. using 100 mL in 250-mL tubes. 735 mL of supernatant was collected ($S_1$), and 600 mL water was added to the remaining cake, which was shaken for 5 min and centrifuged under the same conditions. 600 mL of supernatant ($S_2$) was poured off and saved separately. 300 mL of water was added to the remaining cake, shaken well for 5 min, and divided evenly into flasks and centrifuged under the same conditions. 290 mL of supernatant ($S_3$) was poured off and saved separately. The extracts, $S_1+S_2+S_3$, were combined, yielding a total volume of pigment extract of 1625 mL. The extract was filtered through P8 filter paper, pasteurized to 80° C., poured into HDPE bottles, and chilled in an ice water bath.

Although the quantity of pigment extracted from the retentate was maximized, the color value of the extract decreased owing to the dilutions with water from the rinses. Thus more extract was required to be added to achieve the same color increase as in Example 1.

The characteristics of the extracted pigment solution from the retentate are shown in Table 1. The amount of fortification of the juice can depend on the initial color score of the juice as well as the target value of the color score.

TABLE 1

Characteristics of Pigment Extracts from Retentate

| Examples | Vol (mL) | °Brix | L* | a* | b* | β-carotene (ppm) | lycopene (ppm) |
|---|---|---|---|---|---|---|---|
| 1 | 735 | 8.3 | 44.0 | 22.9 | 17.1 | 9.9 | 66.0 |
| 2 | 1625 | 5.0 | 44.0 | 18.6 | 16.1 | 6.2 | 41.6 |

Application 1

Figure 4A:
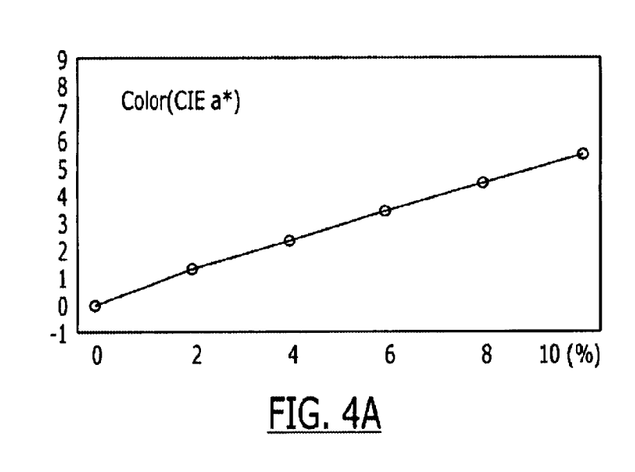
Figure 4B:
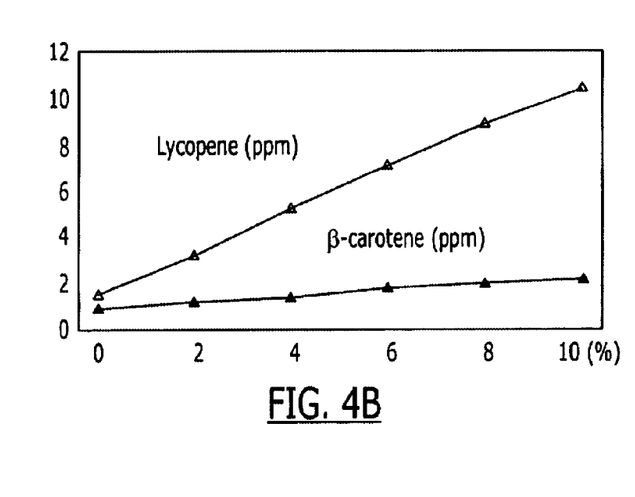
Figure 4C:
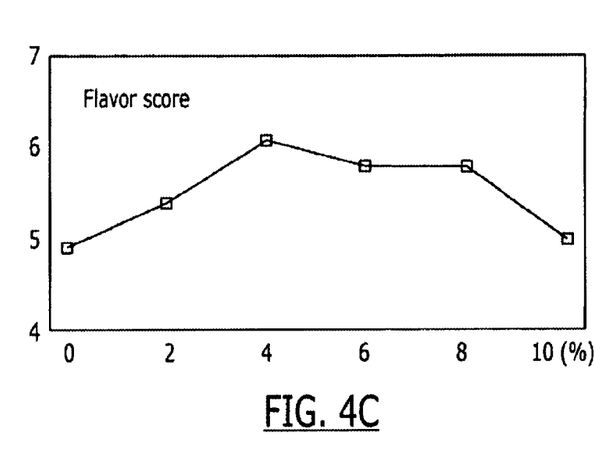

Pigment extract from Example 1 was added to a poorly colored red grapefruit juice concentrate at levels from 2 to 10% and then reconstituted with water (3:1). The reconstituted control juice had a color value a* of −0.04. The color improved significantly as the percentage of pigment extract increased (FIG. 4B), requiring <4% addition to acquire a target a* value of 2.0 (FIG. 4A).

Figure 4D:
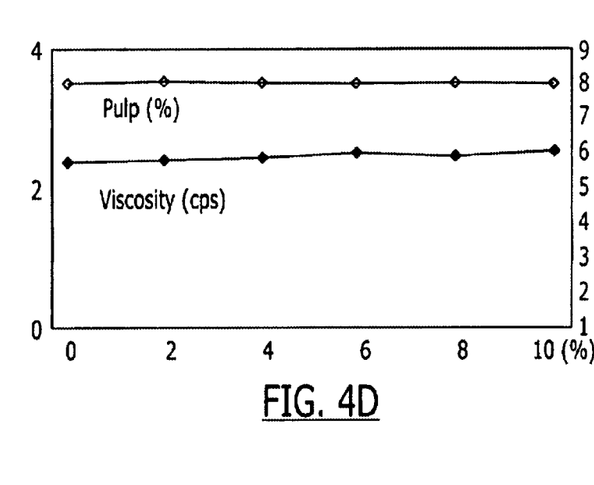

The flavor score (FIG. 4C) showed no negative effects and improved slightly in the 2 to 8% range. The viscosity change was insignificant, and the pulp content indicated no increase (FIG. 4D). The pigment extract was well dispersed in the juice.

Application 2

Figure 5A:
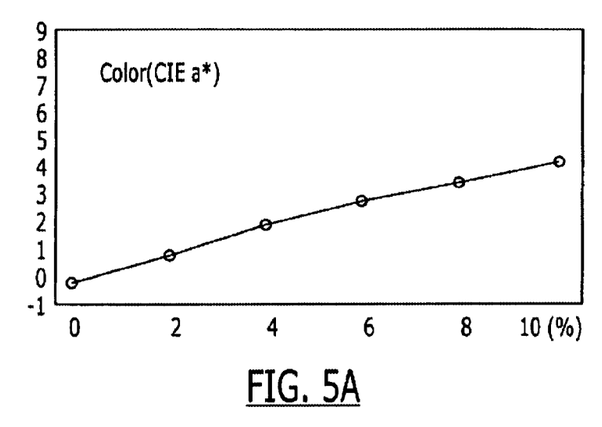
FIGS. 5A–5D are graphs as for FIGS. 4A–4D for Example 2.
Figure 5B:
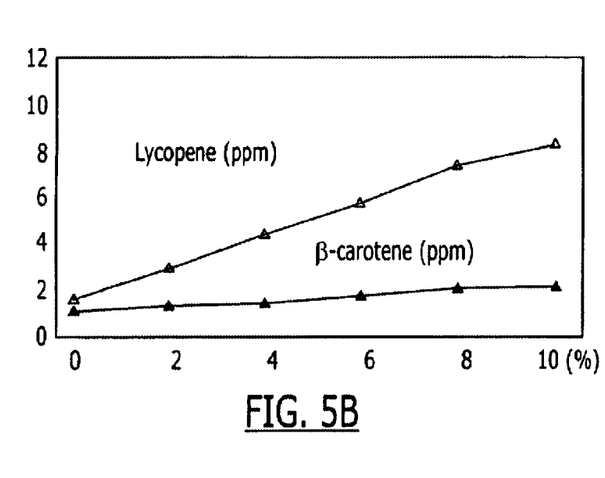
Figure 5C:
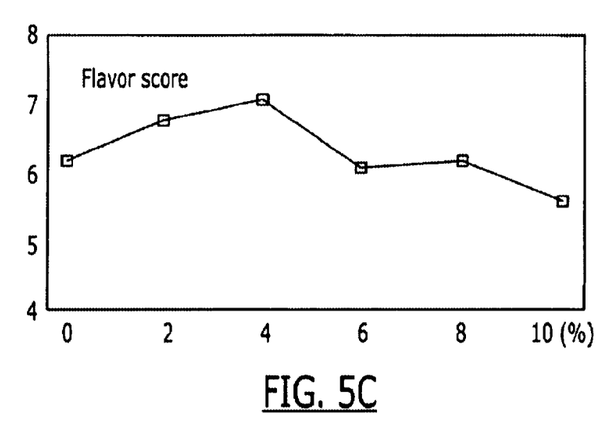
Figure 5D:
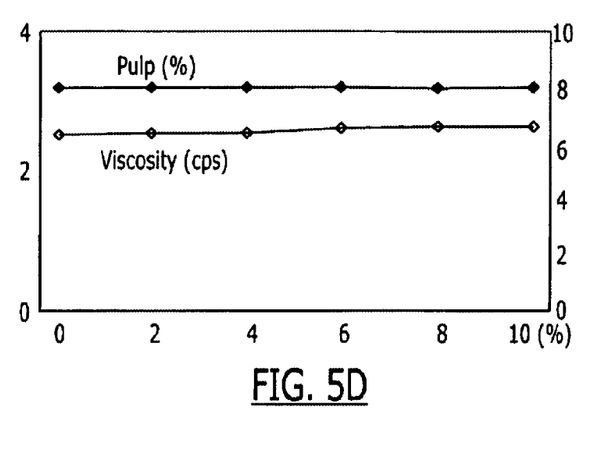

The pigment extract blend of Example 2 was added to poorly colored red grapefruit juice concentrate having an a* value of −0.2 when reconstituted. Blends were prepared from 2.6 to 13.0%. The color improved significantly with an increase in percent pigment extract, achieving the desired a* target value of 2.0 with a <7.8% addition of pigment extract (FIGS. 5A and 5B). The flavor score increased with percent pigment extract added, up to 5.2%, and then gradually declined. The viscosity change was insignificant, and the pulp content indicated no increase (FIG. 5D).

Application 3

Two samples of pigment extract (200 mL each) prepared from Star Ruby retentate were freeze-dried in order to form a concentrate. Freeze-dried pigment extract was redissolved with water (50 mL) and placed in an amber bottle (Example 3, Table 2). Another set of freeze-dried pigment extracts (9.6 g) was redissolved with 20 mL grapefruit permeate (clarified juice) and placed in an amber bottle (Example 4). Concentrated pigment extract Example 3 was designed to reconstitute frozen concentrated grapefruit juice, and the concentrated pigment extract Example 4 was prepared to use with single-strength grapefruit juice.

TABLE 2

Characteristics of Concentrated Pigment Extracts

| Examples | °Brix | L* | a* | b* | β-carotene (ppm) | lycopene (ppm) |
|---|---|---|---|---|---|---|
| 3 | 12.8 | 42.96 | 24.63 | 19.29 | 15.7 | 94.2 |
| 4 | 36.5 | 38.14 | 27.46 | 17.98 | 45.5 | 286.4 |

Using red grapefruit juice concentrate, concentrated pigment extract Example 3 was fortified in the levels indicated in Table 3 to obtain approximately 10.0 °Brix.

TABLE 3

Color Values of Pigment-Fortified Grapefruit Juice

| % (v/v) | °Brix | L* | a* | b* | β-carotene (ppm) | lycopene (ppm) |
|---|---|---|---|---|---|---|
| control | 10.4 | 41.596 | −0.216 | 8.154 | 1.2 | 1.5 |
| 1.9 | 10.6 | 41.986 | 1.610 | 9.272 | 1.4 | 3.4 |
| 3.8 | 10.8 | 41.668 | 2.972 | 10.252 | 1.8 | 5.6 |
| 5.7 | 11.0 | 42.102 | 4.331 | 10.972 | 2.0 | 7.5 |
| 7.6 | 11.1 | 43.148 | 5.984 | 12.396 | 2.4 | 9.6 |
| 19.1 | 12.8 | 42.765 | 11.189 | 15.129 | 4.3 | 21.3 |

A 3.8% level of concentrated pigment extract (Example 3) was able to increase the color score of the grapefruit juice fortified with pigment to a level higher than 2. There were slight changes (increases) in the °Brix of the juice as the level of pigment extract increased.

Application 4

Concentrated pigment extract prepared from permeate (Example 4) was added to single-strength Ruby Red (single-strength grapefruit juice), and the color, pigment content, and °Brix were determined (Table 4).

TABLE 4

Data for Pigment-Fortified Single-Strength Grapefruit Juice

| % (v/v) | °Brix | L* | a* | b* | β-carotene (ppm) | lycopene (ppm) |
|---|---|---|---|---|---|---|
| control | 8.5 | 39.274 | −0.449 | 7.959 | 1.2 | 1.1 |
| 0.5 | 8.7 | 39.638 | 1.118 | 8.527 | 1.4 | 2.6 |

TABLE 4-continued

Data for Pigment-Fortified Single-Strength Grapefruit Juice

| % (v/v) | °Brix | L* | a* | b* | β-carotene (ppm) | lycopene (ppm) |
|---|---|---|---|---|---|---|
| 1.0 | 8.9 | 39.895 | 1.866 | 9.079 | 1.5 | 3.3 |
| 2.0 | 9.2 | 40.125 | 3.866 | 10.324 | 2.1 | 6.1 |
| 3.0 | 9.5 | 40.759 | 5.853 | 11.477 | 2.4 | 8.6 |
| 5.0 | 10.2 | 41.459 | 8.777 | 13.317 | 3.4 | 14.0 |

A 2% (v/v) level of concentrated pigment extract increased the color score of the single-strength grapefruit juice higher than 2.0 (Table 4). There were slight changes (increases) in the °Brix of single-strength grapefruit juice as the level of pigment extract increased. The applications in Tables 3 and 4 show significant color improvement in both fortified and single-strength grapefruit juice by fortifying small amounts of concentrated pigment extract. Freeze-drying can be a means of concentrating the pigment extract.

Preparation of Pigment from In-Line Pulp

EXAMPLE 5

Removal of all Juice from Pulp

Pulp was drained of juice using cheesecloth and squeezing to yield 1000 g of drained pulp. The pulp was rinsed with 45° C. water at a 3:1 ratio (water:pulp) for 3 min, stirring to wash well, and draining through cheesecloth, squeezing to remove liquid. Using the drained pulp, 500 g was placed into a blender with 1000 mL water, and blended at speed 3 for 1 min, or until the slurry flowed well. These steps were repeated for the remaining pulp. All the blended slurry was then combined and homogenized at 7000 psi, the resulting material being collected and chilled in an ice water bath. The homogenization was repeated for two more cycles, chilling after each processing. The total volume of homogenized slurry that was recovered was 2570 mL.

The homogenized pulp was divided into three bottles, and water was added 1:1. This was shaken for 5 min and centrifuged at 6500 rpm for 10 min at 5° C., with 100 mL in each 250-mL tube. The supernatant was poured into bottles, and the pulp cake was saved in a separate bottle. The total amount of added rinse water was 2500 mL, and the total volume of supernatant collected from the first rinse was 3465 mL. 3465 mL water was added to the pulp cake and shaken for 5 min, then centrifuged at 6500 rpm for 5 min at 5° C., with 100 mL in each 250-mL tube. 3420 mL of supernatant was recovered from the second rinse. This was pasteurized to 80° C., placed in an HDPE bottle, and cooled in an ice water bath. The liquid was then filtered through a P8 filter under vacuum.

EXAMPLE 6

Minimization of Water Addition to Increase Concentration

Pulp was drained through cheesecloth, but not all of the juice was squeezed out. 500 g of the wet pulp was weighed out, and the juice was discarded. The pulp was rinsed three times with 500 mL of 45° C. water each time and drained through cheesecloth without squeezing. The pulp volume after the rinsing steps was 470 mL. 500 mL water was added, and the resulting solution was blended in a VitaMix blender for 1 min at speed 3. This material was then homogenized at 7000 psi for three separate cycles and chilled in an ice water bath. 800 mL slurry was recovered. 800 mL water was added, shaken for 5 min, and centrifuged at 6500 rpm for 10 min at 5° C. 1000 mL supernatant was recovered.

The characteristics of the extracted pigment solution from the in-line pulp are shown in Table 5.

TABLE 5

Characteristics of Pigment Extract from In-Line Pulp (vol = 1000 mL)

| Examples | °Brix | L* | a* | b* | β-carotene (ppm) | lycopene (ppm) |
|---|---|---|---|---|---|---|
| 5 | 0.3 | 33.4 | 6.7 | 4.5 | 3.2 | 18.8 |
| 6 | 0.3 | 34.6 | 9.9 | 4.8 | 1.9 | 24.1 |

Application 5

Blends of pigment extract from Example 5 from 5 to 15% were prepared with Ruby Red grapefruit concentrate, and then single-strength juice was prepared (3:1). The level of pigment extract needed to provide a color score of 2.0 from an initial a* value of −0.2 in the control sample was greater than 15% (Table 6). Taste panelists showed an increased preference for blended samples over the control, although some samples were not significantly higher. Viscosity and pulp showed no significant increase over the control sample.

TABLE 6

Data for Color-Enhanced Red Grapefruit Juice

| % (v/v) | °Brix | L* | a* | b* | β-carotene (ppm) | lycopene (ppm) |
|---|---|---|---|---|---|---|
| control | 10.5 | 41.7 | −0.2 | 8.3 | 1.1 | 1.5 |
| 5 | 10.7 | 42.0 | 0.5 | 8.5 | 1.3 | 2.1 |
| 7.5 | 10.7 | 41.5 | 0.8 | 8.3 | 1.3 | 2.6 |
| 10.0 | 10.5 | 41.5 | 1.2 | 8.6 | 1.4 | 2.8 |
| 12.5 | 10.7 | 41.8 | 1.5 | 8.7 | 1.5 | 3.3 |
| 15.0 | 10.4 | 41.1 | 1.6 | 8.4 | 1.5 | 3.5 |

Application 6

Blends of pigment extract Example 6 were prepared from 5 to 15% with Ruby Red grapefruit juice concentrate to prepare single-strength juice (3:1). The required level of extract to achieve an a* value of 2.0 from an initial a* value of −0.1 was slightly less than 10% (Table 7). Taste panelists showed an increased preference for the more highly pigmented juice and indicated a decline in bitterness. Viscosity was not adversely affected, and pulp content increased from 8.5 to 10%.

TABLE 7

Data for Color-Enhanced Red Grapefruit Juice

| % (v/v) | °Brix | L* | a* | b* | β-carotene (ppm) | lycopene (ppm) |
|---|---|---|---|---|---|---|
| control | 10.7 | 41.9 | −0.1 | 8.6 | 1.1 | 1.6 |
| 5 | 10.9 | 41.5 | 0.9 | 8.5 | 1.2 | 2.7 |
| 7.5 | 10.9 | 41.7 | 1.5 | 8.5 | 1.3 | 3.2 |
| 10.0 | 10.8 | 41.6 | 2.1 | 8.5 | 1.4 | 4.0 |
| 12.5 | 10.8 | 41.2 | 2.4 | 8.4 | 1.4 | 4.5 |
| 15.0 | 10.5 | 41.2 | 2.8 | 8.2 | 1.5 | 5.0 |

EXAMPLE 7

The juice was drained from 1000 g of drained pulp using cheesecloth, which was squeezed to remove juice. The juice weighed 1328 g and measured 1300 mL. The pulp was rinsed with 45° C. water at a 3:1 ratio (water:pulp) for 3 min, using stirring to wash well. This material was drained through a cheesecloth, squeezing to remove liquid. 500 g drained pulp was blended with 600 mL water at speed 3 for 1 min or until the slurry flowed well. This was repeated for the remaining pulp. All the blended slurry fractions were combined and homogenized at 7000 psi, collected, and chilled in an ice bath. The homogenization was repeated for two additional cycles, chilling after each processing step. The total volume of homogenized slurry that was recovered was 1750 mL.

The homogenized pulp was divided into two bottles and water was added 1:1, shaken for 5 min, and centrifuged at 6500 rpm for 10 min at 5° C. with 100-mL in 250-mL centrifuge tubes. The supernatant was poured into bottles, and the pulp cake was saved in a separate bottle. The total amount of water added to the first rinse was 1750 mL.

Water was added to the pulp cake (1:1) and shaken for 5 min. The total water added to the second rinse was 1350 mL. 100-mL fractions in 250-mL tubes were centrifuged at 6500 rpm for 5 min at 5° C., and the supernatant was collected in a bottle. The pulp cake weighed 1276.8 g.

The supernatant was centrifuged again to remove particulates, again with 100-mL fractions in 250-mL tubes at 6500 rpm for 5 min at 5° C., and all the supernatant was filtered through a P8 filter with applied vacuum. The pigment extract was pasteurized in a hot water bath for 90 sec at 90° C. and then chilled in an ice water bath and placed in a −10° F. freezer. The total volume of extract collected was 3083 mL. The characteristics of the extracted pigment solution from the in-line pulp are given in Table 8.

TABLE 8

Characteristics of Pigment Extract Example 7 from In-Line Pulp (vol = 3083 mL)

| Ex. | °Brix | L* | a* | b* | β-carotene (ppm) | lycopene (ppm) | naringin (ppm) | limonin (ppm) |
|---|---|---|---|---|---|---|---|---|
| 7 | 0.5 | 33.75 | 10.47 | 5.86 | 3.2 | 18.6 | 73 | 2.7 |

Application 7

Instead of reconstituting the concentrate, single-strength grapefruit juice was fortified with pigment extract. In this case, dried powder of pigment extract Example 7 was directly blended with single-strength grapefruit juice. Dried powder (0.5 g) was added to 100 mL juice.

Figure 6A:
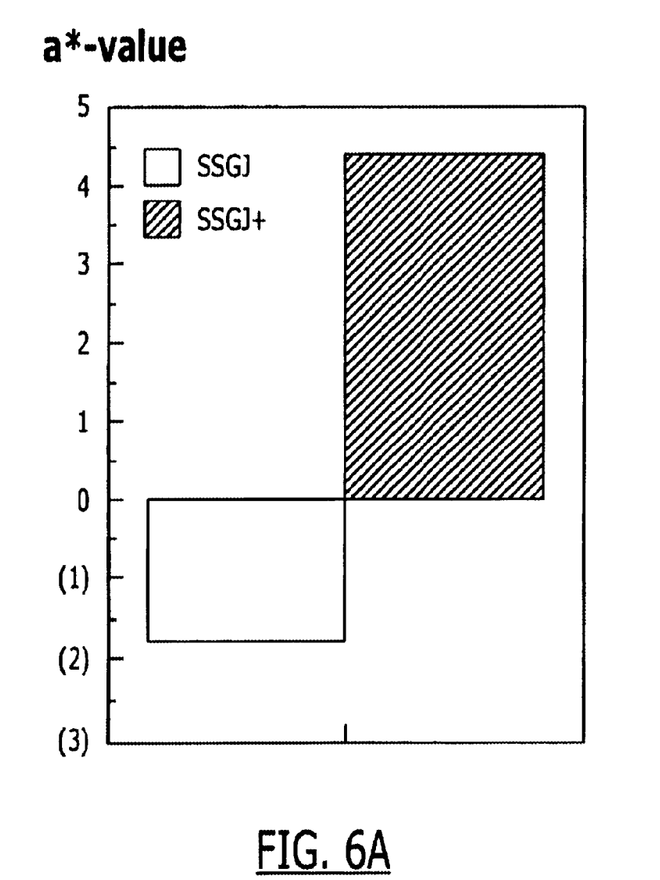
FIGS. 6A and 6B are graphs of color improvement (FIG. 6A) and pigment concentration (FIG. 6B) following the addition of powdered pigment to grapefruit juice.
Figure 6B:
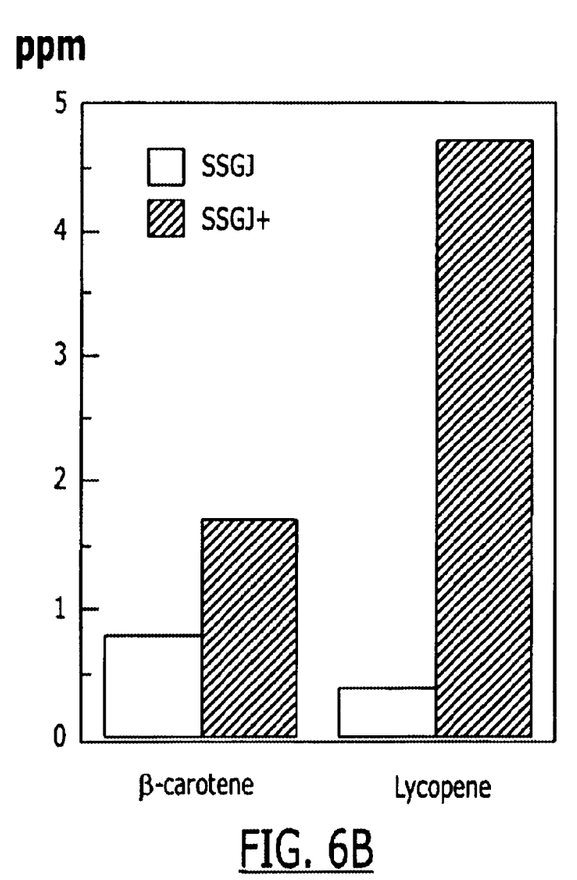

The results showed a significant color enhancement of the juice, as illustrated in FIGS. 6A and 6B. The color score (FIG. 6A) increased by more than a factor of 3, and the carotenoids (β-carotene plus lycopene, FIG. 6B) increased by more than a factor of 5.

Application 8

Two 250-mL samples of pigment extract (Example 7) prepared from in-line pulp were freeze-dried in order to concentrate. The freeze-dried pigment extract (1.7 g) was redissolved with 25 mL water and placed in an amber bottle (Example 8). Another set of freeze-dried pigment extract (1.4 g) was redissolved with 25 mL grapefruit permeate (clarified juice) and placed in an amber bottle (Example 9). Concentrated pigment extract (Example 8) was designed to reconstitute frozen concentrated grapefruit juice, and concentrated pigment extract (Example 9) was prepared for use with single-strength grapefruit juice. The characteristics of Examples 8 and 9 are given in Table 9.

TABLE 9

Characteristics of Concentrated Pigment Extracts

| Example | β-carotene (ppm) | lycopene (ppm) |
|---|---|---|
| 8 | 43.5 | 317.0 |
| 9 | 39.2 | 285.0 |

Using red grapefruit juice concentrate, concentrated pigment extract (Example 8) was added at the levels shown in Table 10 to obtain approximately 10 °Brix.

TABLE 10

Data for Pigment-Fortified Grapefruit Juice from Concentrate

| % (v/v) | °Brix | L* | a* | b* | β-carotene (ppm) | lycopene (ppm) |
|---|---|---|---|---|---|---|
| control | 8.4 | 42.545 | −0.126 | 8.876 | 1.1 | 1.5 |
| 0.4 | 8.7 | 44.382 | 0.973 | 10.118 | 1.3 | 2.4 |
| 1.1 | 8.6 | 41.812 | 2.205 | 9.405 | 1.5 | 3.7 |
| 1.9 | 8.6 | 42.845 | 3.858 | 10.684 | 1.8 | 5.6 |
| 3.8 | 8.6 | 41.381 | 6.397 | 11.155 | 2.2 | 7.7 |

It may be seen that a level of concentrated pigment extract (Example 8) of less than 2% was able to increase the color score of the juice to a level above 2.

Application 9

Concentrated pigment extract dissolved in serum (Example 9) was added to single-strength Ruby Red single-strength grapefruit juice at the levels shown in Table 11. The color and pigment content of the blends were analyzed with the use of HPLC.

TABLE 11

Data on Pigment-Fortified Grapefruit Juice

| % (v/v) | L* | a* | b* | β-carotene (ppm) | lycopene (ppm) |
|---|---|---|---|---|---|
| control | 39.173 | −0.509 | 7.750 | 1.2 | 1.4 |
| 0.5 | 40.839 | 0.520 | 8.453 | 1.4 | 2.6 |
| 1.5 | 39.199 | 2.628 | 8.831 | 1.7 | 4.9 |
| 2.5 | 39.747 | 4.029 | 9.825 | 2.0 | 6.6 |
| 5.0 | 39.464 | 6.747 | 10.685 | 2.6 | 10.8 |

From these data it may be seen that a 1.5% (v/v) level of concentrated pigment extract (Example 9) was able to increase the color score of the juice to a level above 2.0. The applications in both Tables 10 and 11 show significant color improvement in both grapefruit juice from concentrate and single-strength grapefruit juice by fortifying with small amounts of concentrated pigment extract from in-line pulp.

It may be appreciated by one skilled in the art that additional embodiments may be contemplated, including similar approaches to an improvement in color quality to other fruit juices, foods, and other comestibles.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. An aqueous method for extracting a color-enhancing pigment comprising the steps of:
    separating grapefruit into in-line pulp and juice;
    separating the juice into clarified juice and retentate;
    homogenizing at least one of the retentate and the in-line pulp to form a slurry; and
    recovering the pigment from the slurry.

2. The method recited in claim 1, wherein the grapefruit separating step comprises the step of sending the grapefruit through an extractor and a finisher to produce the in-line pulp and juice.

3. The method recited in claim 1, wherein the juice separating step comprises the step of filtering the juice.

4. The method recited in claim 3, wherein the filtering step comprises ultrafiltration.

5. The method recited in claim 1, further comprising the step of debittering the in-line pulp prior to the homogenizing step.

6. The method recited in claim 5, wherein the debittering step comprises rinsing with water having a temperature sufficiently high to remove bitter compounds from the in-line pulp and sufficiently low to prevent damage to the pigment.

7. The method recited in claim 6, wherein the bitter compounds comprise naringin and limonin.

8. The method recited in claim 6, wherein the temperature comprises approximately 45° C.

9. The method recited in claim 1, wherein the recovering step comprises washing the slurry with an aqueous solution and centrifuging the washed slurry, the pigment remaining in a supernatant of the centrifuging step.

10. The method recited in claim 9, wherein the washing and centrifuging steps comprise repeated cycles of washing and centrifuging the slurry.

11. The method recited in claim 9, further comprising the step of filtering the supernatant.

12. The method recited in claim 1, further comprising the step of subjecting the homogenized retentate to centrifugation, a supernatant therefrom containing the pigment.

13. The method recited in claim 12, further comprising the step of filtering the supernatant.

14. The method recited in claim 12, further comprising the steps of washing a pellet from the centrifuging step with an aqueous solution to extract additional pigment and centrifuging the washed pellet, a supernatant therefrom containing additional pigment.

15. The method recited in claim 14, further comprising the steps of repeated pellet washing and centrifuging steps to maximize pigment extraction.

16. The method recited in claim 1, wherein the homogenizing step comprises applying pressure to the at least one of the retentate and the in-line pulp, a level of the applied pressure sufficiently large to achieve pigment extraction and sufficiently low to avoid the generation of sufficient heat to compromise pigment stability and cause an undesirable odor in the formed slurry.

17. An aqueous method of enhancing the color of grapefruit juice comprising the steps of:
    separating grapefruit into in-line pulp and juice;
    separating the juice into clarified juice and retentate;
    homogenizing at least one of the retentate and the in-line pulp to form a slurry;
    recovering the pigment from the slurry; and
    adding the pigment to grapefruit juice to enhance a color thereof.

18. The method recited in claim 17, wherein the grapefruit separating step comprises the step of sending the grapefruit through an extractor and a finisher to produce the in-line pulp and juice.

19. The method recited in claim 17, wherein the juice separating step comprises the step of filtering the juice.

20. The method recited in claim 19, wherein the filtering step comprises ultrafiltration.

21. The method recited in claim 17, further comprising the step of debittering the in-line pulp prior to the homogenizing step.

22. The method recited in claim 21, wherein the debittering step comprises rinsing with water having a temperature sufficiently high to remove bitter compounds from the in-line pulp and sufficiently low to prevent damage to the pigment.

23. The method recited in claim 22, wherein the bitter compounds comprise naringin and limonin.

24. The method recited in claim 22, wherein the temperature comprises approximately 45° C.

25. The method recited in claim 17, wherein the recovering step comprises washing the slurry with an aqueous solution and centrifuging the washed slurry, the pigment remaining in a supernatant of the centrifuging step.

26. The method recited in claim 25, wherein the washing and centrifuging steps comprise repeated cycles of washing and centrifuging the slurry.

27. The method recited in claim 25, further comprising the step of filtering the supernatant.

28. The method recited in claim 17, further comprising the step of subjecting the homogenized retentate to centrifugation, a supernatant therefrom containing the pigment.

29. The method recited in claim 28, further comprising the step of filtering the supernatant.

30. The method recited in claim 28, further comprising the steps of washing a pellet from the centrifuging step with an aqueous solution to extract additional pigment and centrifuging the washed pellet, a supernatant therefrom containing additional pigment.

31. The method recited in claim 30, further comprising the steps of repeated pellet washing and centrifuging steps to maximize pigment extraction.

32. The method recited in claim 17, wherein the homogenizing step comprises applying pressure to the at least one of the retentate and the in-line pulp, a level of the applied pressure sufficiently large to achieve pigment extraction and sufficiently low to avoid the generation of sufficient heat to compromise pigment stability and cause an undesirable odor in the formed slurry.

33. A system for extracting a color-enhancing pigment comprising:
    means for separating grapefruit into in-line pulp and juice;
    means for separating the juice into clarified juice and retentate;
    means for homogenizing at least one of the retentate and the in-line pulp to form a slurry; and
    means for recovering the pigment from the slurry.

34. The system recited in claim 33, wherein the grapefruit separating step comprises an extractor and a finisher.

35. The system recited in claim 33, wherein the juice separating means comprises an ultrafiltration device.

36. The system recited in claim 33, wherein the homogenizing means comprises means for applying sufficient pressure to the retentate and the in-line pulp to lyse intact pulp cells therein.

37. The system recited in claim 33, wherein the pigment recovery means comprises means for adding an aqueous solution to the slurry and a centrifuge for separating a pigment-containing supernatant from a pellet.

38. The system recited in claim 33, further comprising means for debittering the in-line pulp prior to homogenization.

39. The system recited in claim 38, wherein the debittering means comprises means for heating the in-line pulp to a temperature sufficient to extract bitter compounds from the in-line pulp but sufficiently low to avoid damage to pulp cells within the in-line pulp.

40. The system recited in claim 39, wherein the heating means comprises means for heating the in-line pulp to a temperature of approximately 45° C.

41. The system recited in claim 33, wherein the homogenizing means comprises means for applying pressure to the at least one of the retentate and the in-line pulp, a level of the applied pressure sufficiently large to achieve pigment extraction and sufficiently low to avoid the generation of sufficient heat to compromise pigment stability and cause an undesirable odor in the formed slurry.

* * * * *